United States Patent
Breedvelt-Schouten et al.

(10) Patent No.: US 9,858,855 B2
(45) Date of Patent: Jan. 2, 2018

(54) WEARABLE DISPLAY DEVICE

(71) Applicant: INTERNATIONAL BUSINESS MACHINES CORPORATION, Armonk, NY (US)

(72) Inventors: Ilse M. Breedvelt-Schouten, Ottawa (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 14/297,091

(22) Filed: Jun. 5, 2014

(65) Prior Publication Data

US 2015/0355677 A1   Dec. 10, 2015

(51) Int. Cl.
*G06F 3/041* (2006.01)
*G09G 3/3208* (2016.01)
*G02B 27/00* (2006.01)
*G06F 3/01* (2006.01)
*G06F 3/0346* (2013.01)

(52) U.S. Cl.
CPC ....... *G09G 3/3208* (2013.01); *G02B 27/0093* (2013.01); *G06F 3/013* (2013.01); *G06F 3/0346* (2013.01); *G06F 2200/1637* (2013.01); *G09G 2354/00* (2013.01); *G09G 2380/02* (2013.01)

(58) Field of Classification Search
CPC .... G06F 1/163; G06F 1/1626; G06F 3/04886; G06F 2200/1637; G09G 3/3208; G02B 27/0093
See application file for complete search history.

(56) References Cited

U.S. PATENT DOCUMENTS

| | | | |
|---|---|---|---|
| 5,931,764 A | 8/1999 | Freeman et al. | |
| 8,279,170 B2 | 10/2012 | Sugahara | |
| 2004/0233275 A1* | 11/2004 | Tomita | G02B 27/0093 348/51 |
| 2007/0106172 A1 | 5/2007 | Abreu | |
| 2008/0174451 A1 | 7/2008 | Harrington | |
| 2011/0187681 A1* | 8/2011 | Kim | G06F 1/1652 345/204 |

(Continued)

OTHER PUBLICATIONS

S. Tabbitt, "CES 2013: Papertab Tablet Boasts Flexible Display", UBM, LLC, Information Week, informationweek.com, Jan. 8, 2013, pp. 1-6.

(Continued)

*Primary Examiner* — Ilana Spar
*Assistant Examiner* — Brent D Castiaux
(74) *Attorney, Agent, or Firm* — Law Office of Jim Boice (57) ABSTRACT

A wearable display device comprises: a set of position sensors, wherein the position sensors provide positioning data that describe a physical three-dimensional orientation of the wearable display device in real time; an exterior display surface that comprises a continuous display with a dynamically adjusted display region; and a video display controller, wherein the video display controller displays a video content on the region directed to the user's eyes on the dynamically adjusted display region based on the physical three-dimensional orientation of the wearable display device.

18 Claims, 6 Drawing Sheets

(56) References Cited

U.S. PATENT DOCUMENTS

| | | | | |
|---|---|---|---|---|
| 2012/0092363 A1* | 4/2012 | Kim | ................. | G06T 5/006 345/618 |
| 2012/0235893 A1 | 9/2012 | Phillips et al. | | |
| 2012/0236107 A1* | 9/2012 | Rosenberg | ............... | H04N 7/15 348/14.08 |
| 2013/0076612 A1 | 3/2013 | Myers | | |
| 2013/0077049 A1* | 3/2013 | Bohn | ................. | G02B 5/20 351/210 |
| 2013/0222270 A1* | 8/2013 | Winkler | ............. | H04M 1/0233 345/173 |
| 2013/0262298 A1* | 10/2013 | Morley | .................. | H04M 1/05 705/39 |

OTHER PUBLICATIONS

Anonymous, "Flexible Displays are the Future—Papertab Head Reveals His Vision", Haymarket Media Group, stuff.tv, Jan. 21, 2013, pp. 1-6.

S. R. Epps, "Wearable Devices' Next Design Challenge: The Human Brain", Say Media Inc., readwrite.com, Feb. 4, 2013, pp. 1-5.

L. Eadicicco, "Watch Out! The World's Thinnest Wristwatch Launches on Kickstarter", Designtechnica Corporation, digitaltrends.com, Jan. 17, 2013, pp. 1-4.

K. Moskvitch, "Bend Me, Shape Me: Flexible Phones 'Out by 2013'", BBC News, Technology, Nov. 29, 2012, pp. 104.

Anonymous, "Flex Sensor 4.5'", Sparkfun Electronics, sparkfun.com, Retrieved Dec. 12, 2014, pp. 1-6.

Anonymous, "Anamorphic Widescreen", Wikimedia Foundation, Inc., wikipedia.org, Retrieved Dec. 12, 2014, Last Modified Sep. 22, 2014, pp. 1-6.

Anonymous, "Flexible Display", Wikimedia Foundation, Inc, wikipedia.org, Retrieved Dec. 12, 2014, Last Modified Oct. 29, 2014, pp. 1-7.

Anonymous, "Two-Directional Bi-Flex Sensors TM", Images SI, Inc., imagesco.com, Retrieved Dec. 12, 2014, pp. 1-4.

List of IBM Patent and Patent Applications Treated as Related, Mar. 11, 2015.

U.S. Appl. No. 14/568,601—Non-Final Office Action dated May 5, 2016.

* cited by examiner

FIG. 6

WEARABLE DISPLAY DEVICE

BACKGROUND

The present disclosure relates to the field of electronic devices, and specifically to output display devices used with computers. Still more specifically, the present invention relates to wearable display devices.

SUMMARY

In one embodiment of the present invention, a method and/or computer program product displays video content on a wearable display device. Positioning data from position sensors in a wearable display device describe a physical three-dimensional orientation of the wearable display device in real time. The wearable display device has an exterior display surface that includes a dynamically adjusted display region of a continuous display. Video content is selectively displayed on the dynamically adjusted display region of the continuous display based on the physical three-dimensional orientation of the wearable display device.

In one embodiment of the present invention, a wearable display device comprises: a set of position sensors, wherein the position sensors provide positioning data that describe a physical three-dimensional orientation of the wearable display device in real time; an exterior display surface that comprises a dynamically adjusted display region of a continuous display; and a video display controller, wherein the video display controller displays a video content on the dynamically adjusted display region of the continuous display based on the physical three-dimensional orientation of the wearable display device.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
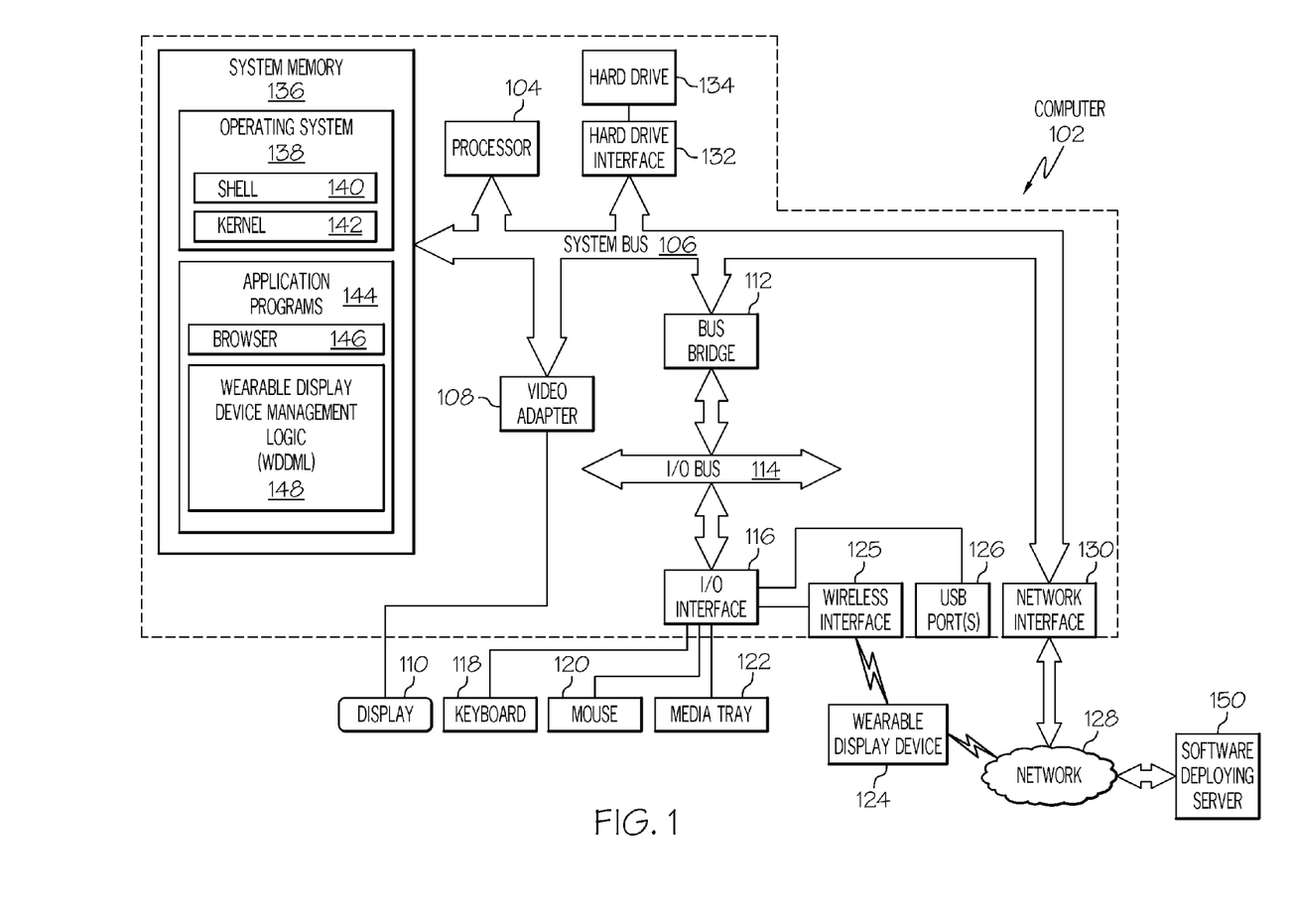
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a wearable display device 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a wearable display device 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

Note that in one embodiment, the wearable display device 124 communicates with computer 102 directly via a wireless interface 125, which includes a transceiver capable of sending and receiving radio frequency, infrared, or other wireless transmission carrier signals. In one embodiment, the wearable display device 124 communicates with computer 102 via the network 128, assuming that network 128 includes hardware capable of transceiving (transmitting and receiving) radio frequency, infrared, or other wireless transmission carrier signals.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150.

Application programs 144 in computer 102's system memory (as well as software deploying server 150's system memory) also include a wearable display device management logic (WDDML) 148. WDDML 148 includes code for implementing the processes described below, including those described in FIGS. 2-6. In one embodiment, computer 102 is able to download WDDML 148 from software deploying server 150, including in an on-demand basis, wherein the code in WDDML 148 is not downloaded until needed for execution. Note further that, in one embodiment of the present invention, software deploying server 150 performs all of the functions associated with the present invention (including execution of WDDML 148), thus freeing computer 102 from having to use its own internal computing resources to execute WDDML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
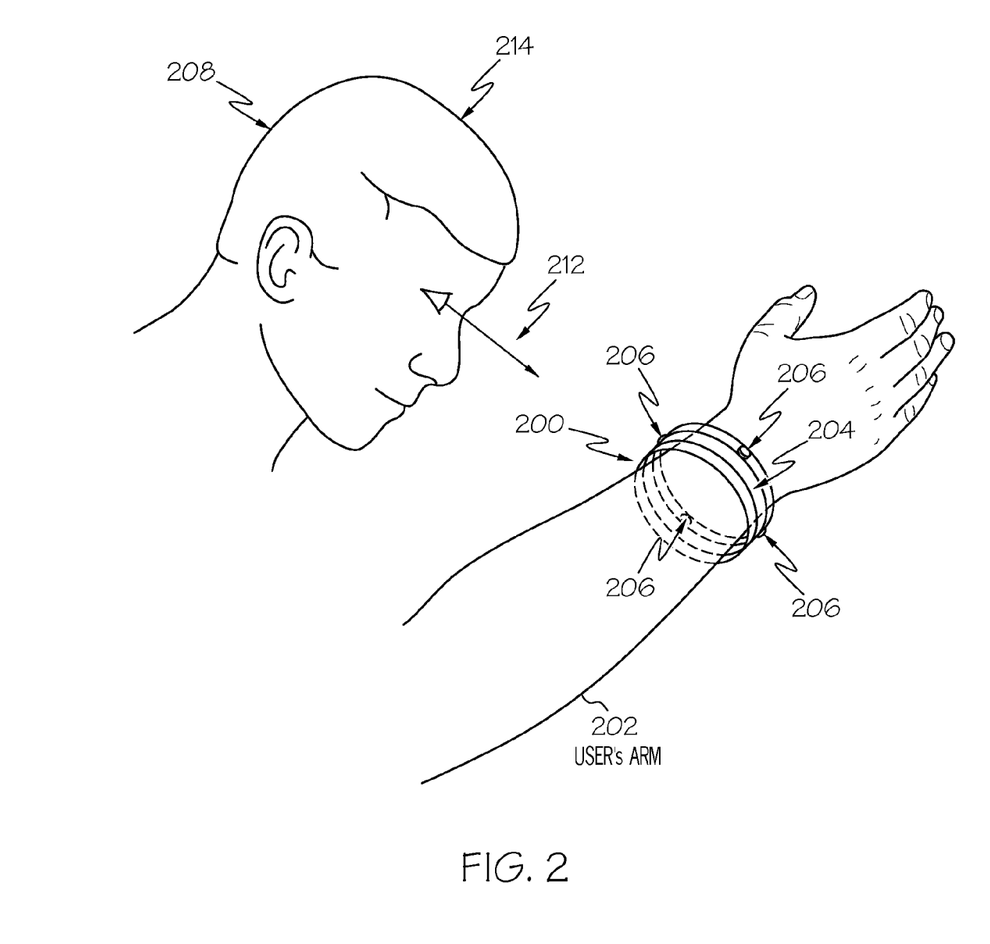
FIG. 2 illustrates an exemplary wearable display device on a user's arm.

With reference now to FIG. 2, an exemplary wearable display device 200 is depicted on a user's arm 202. As depicted, the wearable display device 200 has an exterior display surface 204. The exterior display surface 204 is composed of a flexible display material, such as an organic light-emitting diode (OLED), a flexible e-paper display, an active matrix light emitting diode (AMOLED) display, etc. All such display materials have a matrix of electroluminescent light emitting material that, analogous to a rigid light emitting diode (LED) or plasma display, is able to selectively illuminate pixel points on the display in order to generate images, including text, photos, videos, etc. While different technologies can be used to manufacturer and/or utilizes such flexible displays, an exemplary technology uses OLED displays, which have a layer of semiconductors (i.e., LEDs), each of which is situated between two electrodes in order to selectively turn each LED off and on.

Mounted on wearable display device 200 are multiple sensors 206. As described herein and in various embodiments of the present invention, sensors 206 may be cameras, infrared (IR) sensors, radio frequency (RF) sensors, input buttons, etc. That is, in various embodiments of the present invention sensors 206 are position sensors, cameras, signal receivers, etc. Usages of such sensors 206 are presented in further detail below, including FIG. 5.

Figure 3:
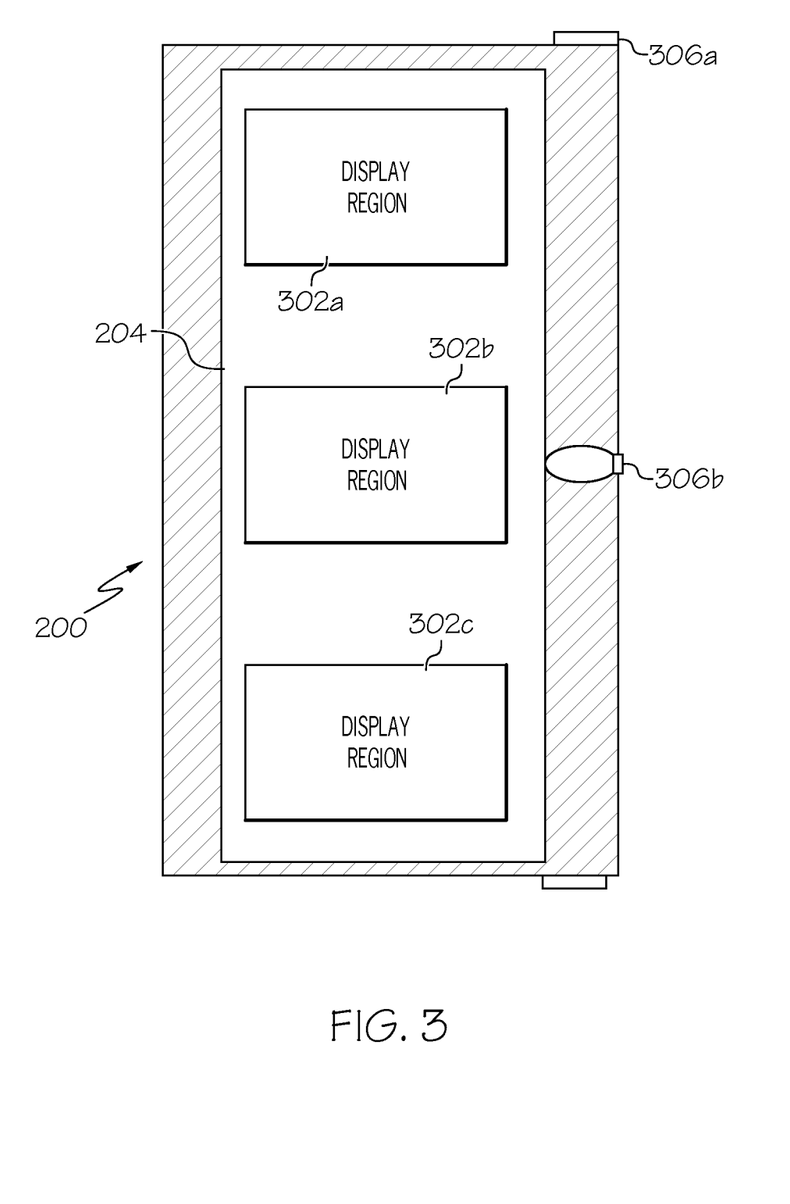
FIG. 3 depicts additional detail of an exterior surface of the wearable display device in FIG. 2, which includes a dynamically adjusted display region of a continuous display.

With reference now to FIG. 3, additional detail of exterior display surface 204 of the wearable display device 200 shown in FIG. 2 is presented. As depicted, the exterior display surface 204 includes multiple video display regions 302a-302c. That is, in a preferred embodiment exterior display surface 204 is a single display, on which there are various regions (display regions 302a-302c), which are regions/areas on which information can be selectively displayed (e.g., as in a window, pane, etc.). While only three video display regions 302a-302c are depicted, it is understood that more or fewer video display regions 302a-302c can be presented on the exterior display surface 204.

Note that in a preferred embodiment of the present invention, the video display regions 302a-302c shown in FIG. 3 are selectively located at various positions on the display. That is, the video display regions 302a-302a are dynamically adjustable regions, rather than fixed, distinct, non-overlapping areas on the display. Thus, in this embodiment, there are not three distinct display regions (depicted as display regions 302a-302c), but rather there is a single display region, which is dynamically movable according to the relative position (as determined by triangulation of readings from the sensors 206) of the user's face/eyes. That is, each of the depicted display regions 302a-302c are dynamically adjusted display regions of the continuous display that is display surface 204.

For example, assume the display surface 204 has pixel locations (x,y), where x=the position of a pixel with respect to the edges of the band, and y=the position of a pixel around the circumference of the band. In this example, a particular display region is of a fixed size (e.g., 100×100 pixels), located at base/anchor coordinate (0,0), (0,1), (0, 6) or (0, 101) or any other location. By fixing the base/anchor coordinate (from which the 100×100 other pixels are anchored), and by associating this base/anchor coordinate with a position that is best in the line of sight of the user (as determined by triangulation of signals from the sensors/cameras 206) the content is positioned and displayed on a location of the display surface 204 that provides optimal visibility of the content to the user.

Thus, one or more embodiments of the present invention are directed to selecting a particular video display region, from the multiple video display regions 302a-302c, to be used depending on the orientation of the wearable display device 200. That is, the physical orientation of the wearable display device 200, relative to the location of the user/wearer's eyes, determines which of the multiple video display regions 302a-302c provides the best view of a displayed image to the user. For example, a user 208 depicted in FIG. 2 is wearing the wearable display device 200 and is looking at the wearable display device 200. In order to see a particular image, the video display region, from video display regions 302a-302c, that is most directly in the line of sight 212 is utilized. Again, while video display regions 302a-302c are depicted as separate regions for the purposes of explanation, it is to be understood that in a preferred embodiment, video display regions 302a-302c are actually dynamically selectable regions for presenting the optimal view of a display to the user.

In order to determine which of the video display regions 302a-302c will display a video image (or text), the positioning of the wearable display device 200 with relation to the user's eyes/head is determined by various sensors/detectors in one or more embodiments of the present invention. That is, in one or more embodiments of the present invention, the selection of which of the video display regions 302a-302c is used to provide the best line-of-sight viewing angle to the user is determined by positioning sensors.

In one embodiment of the present invention, each of the video display regions 302a-302c presents a complete set of content from a source, such as one of the sensors 206 from FIG. 2 (e.g., if the sensors 206 are cameras). In another embodiment, each of the video display regions 302a-302c selectively present a same image.

That is, in one embodiment of the present invention, each of the video display regions 302a-302c presents an image from a different source. For example, video display region 302a may display a photo taken by a sensor 306a (a camera), and video display region 302b may display a movie taken by a sensor 306b (a video camera). Video display region 302c, however, may display an image taken from an external source and/or storage device, such as a website, a video file server, etc.

Note that in one embodiment, the multiple sensors/cameras 306 ensure that the user's eye is always detected by one or more of the multiple sensors/cameras 306, such that the displayed content is always oriented (displayed) to be visible to the user. In one embodiment, one or more of the sensors/ cameras 306 are utilized to locate the position of the user, while other sensors/cameras 306 are utilized at the same time to capture images. In order to determine which use a particular sensor/camera 306 is being utilized for, one embodiment of the present invention utilizes a proximity sensor, such that a sensor/camera 306 that detects the user 408 at a predetermined distance (e.g., from the user's arm to his face), then that sensor/camera 306 is used to determine which display region of the display will present the video image captured by another sensor/camera 306. In one embodiment, this proximity sensor is an autofocus feature, which uses solid state circuitry to detect the focal length for capturing the user's face.

In another embodiment of the present invention, however, each of the video display regions 302a-302c presents a same copy of an image (e.g., the image captured by sensor 306a, which is a still/video camera), but not at the same time. That is, in this embodiment, the image captured by sensor 306a is displayed on either video display region 302a or video display region 302b or video display region 302c, but not simultaneously.

In one embodiment of the present invention, the wearable display device 200 provides a view to the wearer/user that is not available to the wearer/user. For example, consider the embodiment of the present invention presented in FIG. 4. A user 408, who is wearing the wearable display device 200, has a field of vision 412, which is determined through the use of a position sensor 406a. The field of vision 412 of the user 408 encompasses a video display region 402. However, an object 404 is outside of the field of vision 412 of the user 408. As depicted, though, an image of the object 404 is captured by a sensor (e.g., a camera), such as sensor 406b, and presented on display region 402. Thus, even though the user 408 cannot see the object 404 with just his/her eyes, the user 408 is nonetheless able to see an image of the object 404 on display region 402 as captured by the camera/sensor 406b.

Figure 4:
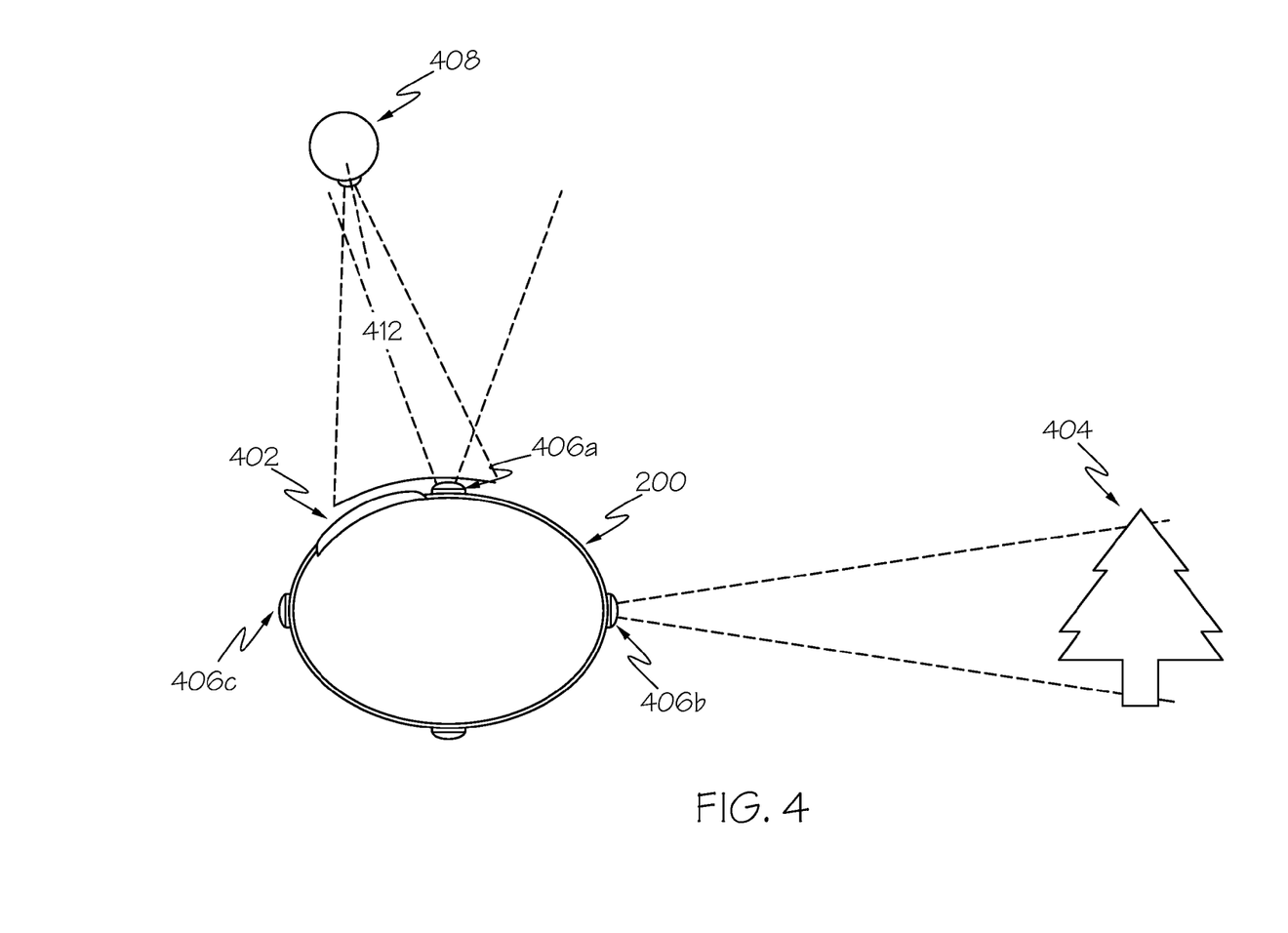
FIG. 4 depicts an embodiment of a wearable display device in which a view of a wearer of the display device aligns or differs from a view captured by a particular camera on the wearable display device.

Note that in a preferred embodiment, the view of user 408, who is wearing the wearable display device 200, and his field of vision 412, which is determined through the use of a position sensor 406a, align with the camera/sensor 406b such that whatever is in the field of view of the user 408 is the same as what is in the field of view of the camera/sensor 406b. In this preferred embodiment, the video display region 402, which is aimed at the user 408, displays the image captured by the sensor/camera 406b. However, if the position of the user 408 changes, then the position of the video display region 402 will likewise move in order to project towards the user 408.

Note that in one embodiment, the wearable display device 200 utilizes one of the multiple cameras (e.g., camera/sensor 406b) to photograph an image (e.g., of object 404), while the other sensors (e.g., sensors 406a and 406c) are used to determine the position of the user 408 using triangulation. That is, the user 408 may move relative to the wearable display device 200. As such, the system will change the position of the video display region 402 in order to reorient it towards the user's eyes, even if the wearable display device 200 (and thus camera 406b) continues to be in a fixed position relative to the object 404. Thus, the video display region 402 is able to be used as a "viewfinder" window, regardless of where the user's head/eyes are relative to the wearable display device 200, since the video display region 402 moves according to the movement of the user 408.

Figure 5:
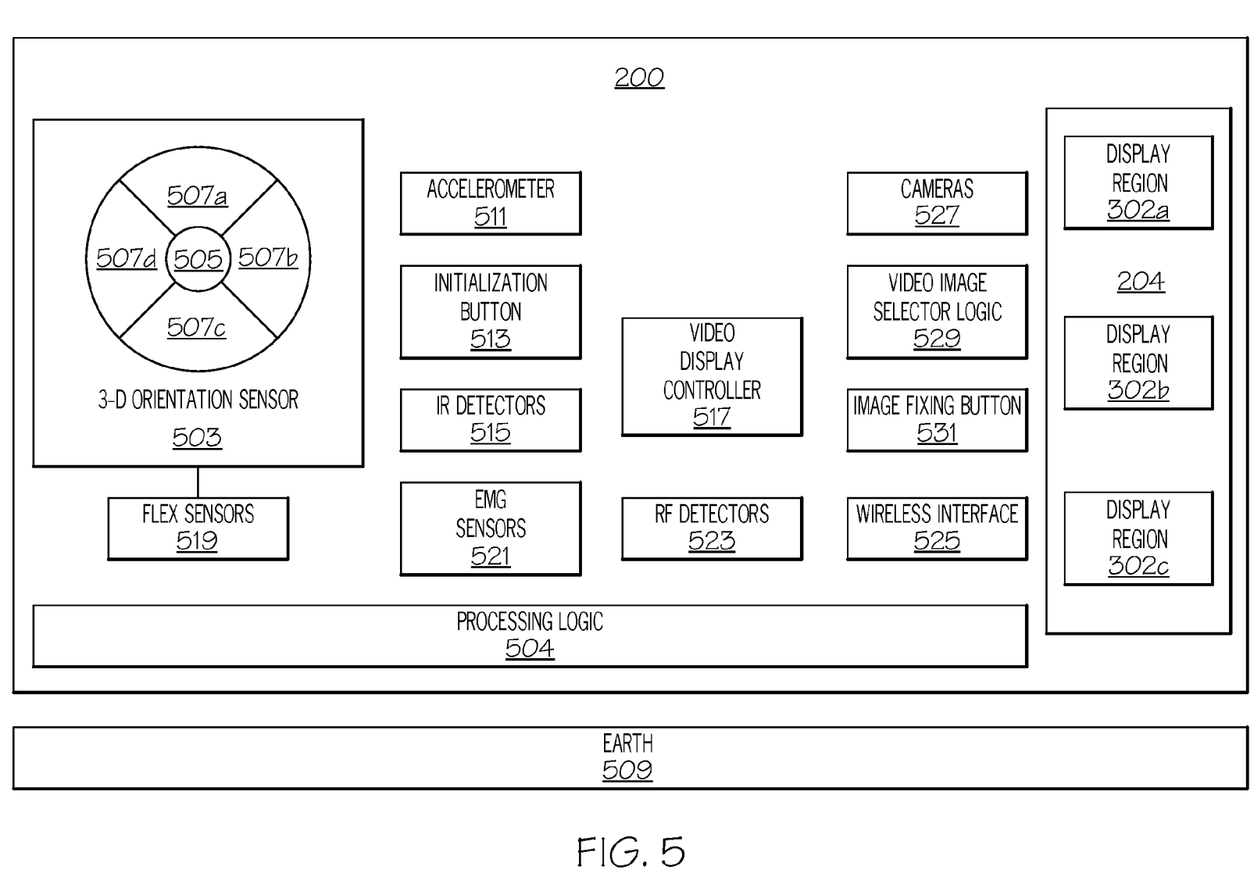
FIG. 5 illustrates various hardware components that are used in one or more embodiments of the wearable display device illustrated in FIG. 2.

With reference now to FIG. 5, various hardware components that are used in one or more embodiments of the wearable display device 200 illustrated in FIG. 2 are presented. One or more of the hardware components depicted are used to determine the three-dimensional orientation of the wearable display device 200, particularly with regard to the spatial relationship between the head and/or eyes of the wearer of the wearable display device 200 and the wearable display device 200 itself.

As depicted in FIG. 5, in one embodiment the wearable display device 200 includes a processing logic 504, which may be a processor, such as processor 104 depicted in FIG. 1. Thus, this embodiment allows the wearable display device 200 to function autonomously. In another embodiment, a wireless interface 525 (analogous to the wireless interface 125 depicted in FIG. 1) provides access to a computer (e.g., computer 102 shown in FIG. 1), which analyzes and/or otherwise processes signals from the sensors and other hardware components depicted in FIG. 5.

In one embodiment of the present invention, the position of wearable display device 200 determines which of the multiple video display regions 302a-302c on the exterior display surface 204 is to be used to display an image. That is, the position of wearable display device 200 identifies where the user's head/eyes are relative to the wearable display device 200 (since the user's head/eyes are fixed to the user's neck/body). Thus, once the position of the wearable display device 200 is known, then the system knows which of the video display regions 302a-302c should be used to present a visual image that is in the user's line of sight. Different examples of hardware devices/sensors within the wearable display device 200 that are capable of determining the position/orientation of the wearable display device 200, with respect to the user's head/eyes, are shown in FIG. 5. This position/orientation information tells the video display controller 517 which of the video display regions 302a-302c should be used to present display information to the user.

For example, in one embodiment of the present invention, the position of the wearable display device 200 on an arm/wrist of a user is determined by a gravity-based three-dimensional (3-D) orientation sensor 503. The 3-D orientation sensor 503 is a weight-enabled sensor capable of determining the orientation of the wearable display device 200. That is, the orientation of the wearable display device 200 (in three dimensions) is determined by the position of the arm/wrist of the user (e.g., user's arm 202 shown in FIG. 2). For example, the user's arm may be hanging down, in front of the user, above the user, with the elbow and/or wrist straight or crooked, etc. Such arm/elbow/wrist positioning results in the wearable display device 200 being positioned in a specific orientation, which is identified by the 3-D orientation sensor 503.

For example, assume that the 3-D orientation sensor has a centroid ball 505. Assume further that surrounding the centroid ball 505 is a pressure detecting material, such as piezoelectric crystals, depicted as regions 507a-507d. When the wearable display device 200 is positioned as shown relative to the Earth 509, then gravity pulls the centroid ball 505 against region 507c of the pressure detecting material. If the wearable display device 200 were to be inverted, then the centroid ball 505 would be pulled against region 507a of the pressure detecting material. If the wearable display device 200 were to be rotated 90-degrees, then the centroid ball 505 would be pulled against either region 507b or 507d of the pressure detecting material. Similarly, if wearable display device 200 were to be partially rotated (i.e., at less than a full 90 degrees or 180 degrees), then the centroid ball 505 would be pulled against proportional amounts of the regions 507, thus presenting a full 360 degree resolution of the orientation of the wearable display device 200.

Assume further that the pressure detecting material surrounding the centroid ball 505 in 3-D orientation sensor 503 surrounds the centroid ball in all three axes (X, Y, Z). This spherical surrounding of pressure detecting material around the centroid ball 505 thus identifies a full 3-D directional orientation of the wearable display device 200.

While the depiction of 3-D orientation sensor 503 provides one enabling embodiment of the present invention, other embodiments may use spring gauges supporting a centroid weight, accelerometers, etc.

In any configuration of the 3-D orientation sensor 503, a correlation is made between the 3-D orientation sensor 503 and the position of the user's arm/wrist. For example, assume that a user has his arm hanging straight down, and that the wearable display device 200 is on his/her wrist. Whenever the user's arm hangs straight down, the centroid ball 505 is known to push down on region 507c of the pressure detecting material shown in 3-D orientation sensor 503. Similarly, whenever the user's arm is straight up, the centroid ball 505 is known to push down on region 507a of the pressure detecting material shown in 3-D orientation sensor 503. Similarly, when the user's arm is extended away from the front of his body, while bending the elbow at 45 degrees, then the centroid ball 505 is known to push against a specific combination of regions 507d and 507c of the pressure detecting material. By comparing current readings from 3-D orientation sensor 503 with known readings, the physical orientation of the wearable display device 200 can be determined. That is, previous readings from the 3-D orientation sensor 503 generated while the user's arm was hanging straight down generated a specific set of outputs from one or more of the regions of pressure detecting material surrounding the centroid ball 505. Thus, if the centroid ball 505 is pressing against the pressure detecting material in region 507c, then a determination is made that the user's arm is hanging straight down by his/her side, assuming that the user is wearing the wearable display device 200 on his/her wrist. Similarly, other known positions/readings are compared with the current readings from the 3-D orientation sensor 503, in order to identify the current position of the wearable display device 200 according to how the position of the user's arm, elbow, wrist, etc. Again, it is to be understood that the regions surrounding the centroid ball 505 are actually three-dimensional regions (rather than the two-dimensional cross section shown in FIG. 5), thereby describing a full 3-D orientation (i.e., along the X, Y, Z Cartesian axes) of the wearable display device 200.

In one embodiment of the present invention, the position of the wearable display device 200 on an arm/wrist of a user is determined by an accelerometer 511. Accelerometer 511 is any electromechanical device capable of detecting movement, in any 3-D axis, of the wearable display device 200. By identifying an initial starting position in 3-D space of the wearable display device 200 (by manual settings or through use of other components within the wearable display device 200), the current real-time position of the wearable display device 200 can be determined by processing logic 504. For example, assume that the user inputs (using an initialization button 513) a signal indicating that the user's arm (on the wrist of which the wearable display device 200 is being worn) is hanging straight down. Thereafter, any movement, in any 3-D space, is detected by the accelerometer 511. These changes are then processed by the processing logic 504, which calculates/determines exactly where the wearable display device 200 is in relation to the user's eyes/head. This tells the video display controller 517 which of the display regions 302a-302c should be used to present display information to the user.

In one embodiment of the present invention, the position of the wearable display device 200 relative to the user's head is determined by infrared (IR) sensors, such as IR detectors 515. That is, assume that multiple IR sensors are positioned about the exterior of the wearable display device 200. Assume further that the user's head emits the greatest amount of heat from his body, since other areas have less blood flow near the skin surface, the face has the greatest density of capillaries near the epidermis, the face is the only part of the body that is usually uncovered by clothing, etc. Thus, one of the IR detectors 515 detects a highest level of IR radiation (heat). The position of that IR detector 515 is thus determined to be facing the user's face (and thus his eyes). This tells the video display controller 517 which of the display regions 302a-302c should be used to present display information to the user.

Thus, the present device determines whether or not the user can see the curved display on the wearable display device 200, and which region of the curved display is most visible to the user. This is performed by a continuous monitoring of visual inputs (images) of the user's face by the multiple sensors/cameras.

In one embodiment of the present invention, the position of the wearable display device 200 relative to the user's head is determined by flex sensors 519. Flex sensors 519 are sensors that detect mechanical distortion of the wearable display device 200. Examples of such flex sensors 519 include strain gauges, including piezoelectric pressure devices that are positioned throughout the wearable display device 200. Assume now that a user is wearing the wearable display device 200 on his wrist. Whenever the user moves his arm/elbow/wrist, a mechanical deformation of the wearable display device 200 occurs (similar to the wrinkling of skin when the arm/elbow/wrist is put into specific positions). This flexing (i.e., torqueing, compression, wrinkling, etc.) of the wearable display device 200 is unique for each positioning of the arm/elbow/wrist. The processing logic 504 thus compares the real time readings from the flex sensors 519 with known/stored readings for specific arm/elbow/wrist positions. This comparison leads to a determination of where the wearable display device 200 is in relation to the user's face (and thus his eyes). This determination allows the video display controller 517 to select which of the display regions 302a-302c is used to present display information to the user.

In one embodiment of the present invention, the position of the wearable display device 200 relative to the user's head is determined by electromyographic (EMG) sensors 521. EMG sensors 521 are sensors that detect muscular movements by the user. That is, whenever a person moves a muscle, an electrical signal (i.e., an ion-induced change in electrical potential across the nerve membrane) is transmitted down axons (nerve fibers) that control the muscles. A motor neuron and the muscles that it innervates are collectively known as a motor unit. When the motor neuron causes the muscles in the motor unit to contract, electrical activity is stimulated in these muscles. The sum of the electrical activity from the motor neuron and the muscles in the motor unit create a motor unit action potential (MUAP), which is measured by the EMG sensors 521. The measured MUAP is analyzed by the processing logic 504 to identify the level of muscle movement. That is, electrical signals are specific enough to identify a location of which muscles are being moved. Whenever the user moves his arm/elbow/wrist, a unique MUAP pattern occurs. Thus, the MUAP pattern detected in real time by the EMG sensors 521 is compared with known/stored MUAP readings for specific arm/elbow/wrist positions. This comparison leads to a determination of where the wearable display device 200 is in relation to the user's face (and thus his eyes). This determination allows the video display controller 517 to select which of the display regions 302a-302c is used to present display information to the user.

In one embodiment of the present invention, the position of the wearable display device 200 relative to the user's head is determined by radio frequency (RF) detectors 523, which detect the location and strength of RF signals coming from the user's head. For example and returning again to FIG. 2, assume that the user 208 has an RF transmitter 214 near or affixed to his head. This RF transmitter may be part of a cell phone that he is holding to his head, or part of a set of "smart glasses" that have electronic capabilities. The RF transmitter 214 transmits a beam to the RF detectors 523 on the wearable display device 200. The RF detectors 523 are positioned across various positions on the wearable display device 200, such that the RF beam reaches the different RF detectors 523 at different times. These time differences (determined in one embodiment by identifying phase shifts that occur as a same signal reaches different RF detectors 523 at different times) allow the processing logic 504 to calculate where the wearable display device 200 is in relation to the user's face (and thus his eyes). This determination allows the video display controller 517 to select which of the display regions 302a-302c is used to present display information to the user.

Returning to FIG. 4, recall that in one embodiment a user is able to see a captured image of an item that is outside of the line of sight of the user. This image capturing is accomplished by one or more cameras 527 shown in FIG. 5. In one embodiment, these multiple cameras 527 capture different images depending on their direction of orientation. Thus, a video image selector logic 529 first detects the images that are captured from the multiple cameras 527. The video image selector logic 529 then determines the viewing direction between the eyes of the user to the wearable display device. Based on this determination the video image selector logic 529 is able to identify which of the cameras captures offset images from a direction other than the viewing direction between the eyes of the user to the wearable display device, and then displays these offset images on the appropriate display region from the display regions 302a-302c that faces the head/eyes of the user.

In one embodiment of the present invention, a user may want to see a same video image on multiple display regions. That is, assume that one or the cameras 527 captures an image of an item (e.g., a tree). Assume further that the user wants multiple copies of this image to be simultaneously displayed on the exterior surface of the wearable display device 200. The user is thus able to activate an image fixing button 531, which may be a mechanical button, an active field on the exterior display surface 204, etc. By engaging/activating the image fixing button 531, the same image will be displayed on all of the display regions 302a-302c simultaneously. In another embodiment, engaging/activating the image fixing button 531 causes each of the cameras 527 mounted on the wearable display device 200 to send an image to a different display region from the display regions 302a-302c. That is, in this embodiment each camera has a display region that is dedicated to the camera only.

Figure 6:
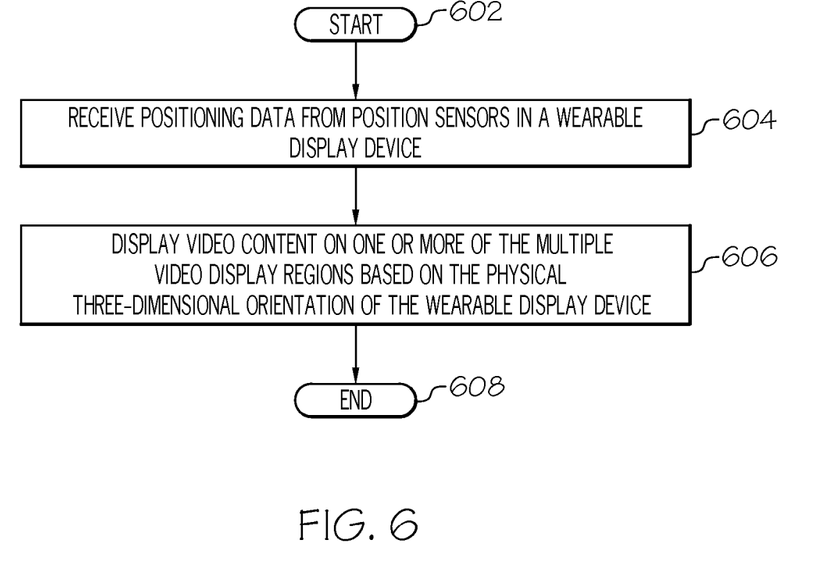
FIG. 6 is a high level flow chart of one or more exemplary steps taken by one or more processors to manage a wearable display device.

With reference now to FIG. 6, a high level flow chart of one or more exemplary steps taken by one or more processors to manage a wearable display device is presented. After initiator block 602, positioning data is received from position sensors in a wearable display device (block 604). These position sensors provide positioning data that describe a physical three-dimensional orientation of the wearable display device in real time. As described herein, the wearable display device has an exterior display surface that includes multiple video display regions (see FIG. 3). Note that the positioning data from the position sensors (e.g., 3-D orientation sensor 503, accelerometer 511, IR detectors 515, flex sensors 519, EMG sensors 521, RF detectors 523 shown in FIG. 5) can be received locally by a processing logic (e.g., the processing logic 504 shown in FIG. 5) or remotely (e.g., a computer 102 shown in FIG. 1).

Returning to FIG. 6, video content is then displayed on one or more of the multiple video display regions based on the physical three-dimensional orientation of the wearable display device, as described in block 606 and discussed in detail herein. The flow-chart ends at terminator block 608.

In one embodiment of the present invention in which the wearable display device is presently worn by a user, the method further comprises receiving, by one or more of the position sensors in the wearable display device, data that describe a location of a head of the user relative to the wearable display device. As discussed above, this relative location of the user's head (with respect to the current real-time location of the wearable display device) can be accomplished by any of the position sensors shown in FIG. 5. Once this relative location/positioning is determined, then the video content is displayed on a video display region, from one or more of the multiple video display regions, that faces the head of the user.

In one embodiment of the present invention in which the wearable display device is currently being worn by a user, the wearable display device has multiple cameras (e.g., cameras 527 depicted in FIG. 5). In this embodiment, the method further comprises detecting images that are captured from the multiple cameras. Using location sensors described herein, the viewing direction between the eyes of the user to the wearable display device is determined, enabling the identification of a camera that captures offset images from a direction other than the viewing direction between the eyes of the user to the wearable display device. The offset images are then displayed on the video display region that faces the head of the user.

In one embodiment of the present invention in which the wearable display is currently being worn by a user, the method further comprises determining the positioning data that describe the physical three-dimensional orientation of the wearable display device by using an array of RF detectors (e.g., RF detectors 523 shown in FIG. 5). In this embodiment, radio frequency (RF) readings are received from an array of RF detectors within the wearable display device. These RF detectors detect a relative location and distance of an RF transmitter that is positioned on a head of the user based on RF transmissions from an RF transmitter (e.g., RF transmitter 214 shown in FIG. 2) that is positioned near the head of the user. A processing logic then determines a location of a face of a user who is wearing the wearable display device based on the RF readings that are received by the array of RF detectors from the RF transmitter on the head of the user. A video display controller (e.g., video display controller 517 shown in FIG. 5), then displays the video content on one or more of the multiple video display regions that are facing the face of the user.

In one embodiment of the present invention, the method further comprises receiving the positioning data that describe the physical three-dimensional orientation of the wearable display device from an accelerometer within the wearable display device. As described with respect to the discussion about accelerometer 511 in FIG. 5, readings from the accelerometer show changes to the position of the wearable display device, particularly in relation to the position of the user's head/eyes.

In one embodiment of the present invention in which the wearable display device is being worn by a user, the method further comprises determining the positioning data that describe the physical three-dimensional orientation of the wearable display device by receiving infrared readings from an array of infrared detectors (e.g., IR detectors 515 shown in FIG. 5) within the wearable display device. These IR detectors allow a processing logic (e.g., processing logic 504 shown in FIG. 5) to identify which of the infrared detectors is detecting a highest level of infrared radiation as compared with other infrared detectors from the array of infrared detectors. This leads to a determination of a location of a face of a user who is wearing the wearable display device as being in a direction that the infrared detector that is detecting the highest level of infrared radiation is facing, since the user's face is emitting more heat than any other part of his body. A video display controller (e.g., video display controller 517 shown in FIG. 5), then displays the video content on one or more of the multiple video display regions that are facing the face of the user.

In one embodiment of the present invention in which the wearable display device is being worn by a user, the method further comprises determining the positioning data that describe the physical three-dimensional orientation of the wearable display device by the use of flex sensors (e.g., flex sensors 519 shown in FIG. 5). A processing logic receives flex readings from flex sensors within the flexible output device, where the flex sensors detect a level of flexing being incurred by the flexible output device in real time. Based on the flex readings, a location and orientation of the flexible output device with relation to a face of a user who is wearing the flexible output device is determined. A video display controller (e.g., video display controller 517 shown in FIG. 5), then displays the video content on one or more of the multiple video display regions that are facing the face of the user.

In one embodiment of the present invention in which the wearable display device is being worn on an arm of a user, the method further comprises determining the positioning data that describe the physical three-dimensional orientation of the flexible output device through the use of electromyogram sensors (e.g., EMG sensors 521 shown in FIG. 5). Electromyographic readings are received from electromyogram sensors within the flexible output device, where the electromyogram sensors detect muscular activity within the arm of the user in real time. Based on the electromyographic readings, a determination is made of a location and orientation of the flexible output device with relation to a face of a user who is wearing the flexible output device. A video display controller (e.g., video display controller 517 shown in FIG. 5), then displays the video content on one or more of the multiple video display regions that are facing the face of the user.

In one embodiment of the present invention in which the wearable display device is being worn on an arm of a user, the method further comprises the use of a three-dimension orientation sensor (e.g., 3-D orientation sensor 503 shown in FIG. 5) to determine the positioning data that describe the physical three-dimensional orientation of the wearable display device. Positioning readings are received from a three-dimension orientation sensor within the wearable display device, where the three-dimension orientation sensor detects gravitational forces from Earth to describe a three-dimensional orientation of the wearable display device in real time. Based on detected Earth gravitational forces, a location and orientation of the wearable display device with relation to a face of a user who is wearing the wearable display device is then determined. A video display controller (e.g., video display controller 517 shown in FIG. 5), then displays the video content on one or more of the multiple video display regions that are facing the face of the user.

In one embodiment of the present invention, the method further comprises receiving, from an image fixing button on the wearable display device, a multi-view signal. This multi-view signal directs a different image from cameras on the wearable display device to be displayed on different display regions from the multiple video display regions.

In one embodiment of the present invention, a wearable display device comprises: a set of position sensors, wherein the position sensors provide positioning data that describe a physical three-dimensional orientation of the wearable display device in real time; an exterior display surface that comprises multiple video display regions; and a video display controller, wherein the video display controller displays a video content on one or more of the multiple video display regions based on the physical three-dimensional orientation of the wearable display device.

In one embodiment of the present invention, the wearable display device further comprises: multiple cameras that capture different images depending on their direction of orientation; and a video image selector logic. In one or more embodiments of the present invention, the video image selector logic: detects images that are captured from the multiple cameras; determines a viewing direction between the eyes of the user to the wearable display device; identifies a camera that captures offset images from a direction other than the viewing direction between the eyes of the user to the wearable display device; and displays the offset images on the video display region that faces the head of the user.

In one embodiment of the present invention, the wearable display device further comprises an array of infrared detectors within the wearable display device; and a video display controller. In one or more embodiments, the video display controller: identifies which of the infrared detectors is detecting a highest level of infrared radiation as compared with other infrared detectors from the array of infrared detectors; determines a location of a face of a user who is wearing the wearable display device as being in a direction that the infrared detector that is detecting the highest level of infrared radiation is facing; and displays the video content on one or more of the multiple video display regions that are facing the face of the user.

In one or more embodiments of the present invention, the wearable display device is a flexible output device that further comprises: flex sensors that detect a level of flexing being incurred by the flexible output device in real time; and a video display controller. The video display controller: determines, based on the flex readings, a location and orientation of the flexible output device with relation to a face of a user who is wearing the flexible output device; and displays the video content on one or more of the multiple video display regions that are facing the face of the user.

In one or more embodiments of the present invention in which the wearable display device is a flexible output device that is worn on an arm of a user, the flexible output device further comprises: electromyogram sensors that detect muscular activity within the arm of the user in real time; and a video display controller. The video display controller: determines, based on the electromyographic readings, a location and orientation of the wearable display device with relation to a face of a user who is wearing the wearable display device; and displays the video content on one or more of the multiple video display regions that are facing the face of the user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of displaying video content on a wearable display device, the method comprising:
   receiving, by one or more processors, positioning data from position sensors in a wearable display device, wherein the wearable display device is worn by a user, wherein the position sensors provide positioning data that describe a physical three-dimensional orientation of the wearable display device in real time, and wherein the wearable display device comprises an exterior display surface that comprises multiple video display regions on a single continuous display;
   displaying a video content on a dynamically adjusted display region of the single continuous display based on the physical three-dimensional orientation of the wearable display device, wherein the dynamically adjusted display region is a single display region that is dynamically moved on the single continuous display;
   determining the positioning data that describe the physical three-dimensional orientation of the wearable display device by:
      receiving, by one or more processors, radio frequency (RF) readings from an array of RF detectors within the wearable display device, wherein the RF detectors detect a relative location and distance between the wearable display device and an RF transmitter that is positioned on a head of the user; and
      determining, by one or more processors, a location, relative to the wearable display device, of a face of the user who is wearing the wearable display device based on the RF readings that are received by the array of RF detectors from the RF transmitter on the head of the user; and
   displaying the video content on the dynamically adjusted display region of the single continuous display that is facing the face of the user.

2. The method of claim 1, wherein the method further comprises:
   receiving, by one or more of the position sensors in the wearable display device, data that describe a location of the head of the user relative to the wearable display device; and
   displaying the video content on a video display region, from the dynamically adjusted display region of the single continuous display that faces the head of the user.

3. The method of claim 1, wherein the wearable display device comprises multiple cameras, and wherein the method further comprises:
   detecting, by one or more processors, images that are captured from the multiple cameras;
   determining, by one or more processors, a viewing direction from eyes of the user to the wearable display device;
   identifying, by one or more processors, a camera that captures offset images from a direction other than the viewing direction from the eyes of the user to the wearable display device; and
   displaying the offset images on a video display region that faces the head of the user.

4. The method of claim 1, further comprising:
   receiving, by one or more processors, the positioning data that describe the physical three-dimensional orientation of the wearable display device from an accelerometer within the wearable display device.

5. The method of claim 1, and wherein the method further comprises:
   determining the positioning data that describe the physical three-dimensional orientation of the wearable display device by:

receiving, by one or more processors, infrared readings from an array of infrared detectors within the wearable display device;

identifying, by one or more processors, which of the infrared detectors is detecting a highest level of infrared radiation as compared with other infrared detectors from the array of infrared detectors;

determining, by one or more processors, a location of the face of the user who is wearing the wearable display device as being in a direction that the infrared detector that is detecting the highest level of infrared radiation is facing; and displaying the video content on the dynamically adjusted display region of the single continuous display that faces the face of the user.

6. The method of claim 1, wherein the wearable display device is a flexible output device that is worn by the user, and wherein the method further comprises:

determining the positioning data that describe the physical three-dimensional orientation of the wearable display device by:

receiving, by one or more processors, flex readings from flex sensors within the flexible output device, wherein the flex sensors detect a level of flexing being incurred by the flexible output device in real time;

determining, by one or more processors and based on the flex readings, a location and orientation of the flexible output device with relation to the face of the user who is wearing the flexible output device; and displaying the video content on the dynamically adjusted display region of the single continuous display that faces the face of the user.

7. The method of claim 1, wherein the wearable display device is a flexible output device that is worn on an arm of the user, and wherein the method further comprises:

determining the positioning data that describe the physical three-dimensional orientation of the flexible output device by:

receiving, by one or more processors, electromyographic readings from electromyogram sensors within the flexible output device, wherein the electromyogram sensors detect muscular activity within the arm of the user in real time;

determining, by one or more processors and based on the electromyographic readings, a location and orientation of the flexible output device with relation to the face of the user who is wearing the flexible output device; and displaying the video content on the dynamically adjusted display region of the single continuous display that faces the face of the user.

8. The method of claim 1, wherein the wearable display device is worn on an arm of the user, and wherein the method further comprises:

determining the positioning data that describe the physical three-dimensional orientation of the wearable display device by:

receiving, by one or more processors, positioning readings from a three-dimension orientation sensor within the wearable display device, wherein the three-dimension orientation sensor detects gravitational forces from Earth to describe a three-dimensional orientation of the wearable display device in real time;

determining, by one or more processors and based on detected Earth gravitational forces, a location and orientation of the wearable display device with relation to the face of the user who is wearing the wearable display device; and displaying the video content on the dynamically adjusted display region of the single continuous display that faces the face of the user.

9. The method of claim 1, further comprising:

receiving, from an image fixing button on the wearable display device, a multi-view signal, wherein the multi-view signal directs a different image from cameras on the wearable display device to be displayed on different display regions from the dynamically adjusted display region of the single continuous display.

10. A wearable display device, comprising:

a display on an exterior side of the wearable display device;

one or more sensors that detect an angle of eyes of a user relative to the display;

one or more processors that receive positioning data from position sensors in the wearable display device, wherein the wearable display device is worn by a user, wherein the position sensors provide positioning data that describe a physical three-dimensional orientation of the wearable display device in real time, wherein the wearable display device comprises an exterior display surface that comprises multiple video display regions on a single continuous display, and wherein the one or more processors determine the positioning data that describe the physical three-dimensional orientation of the wearable display device by:

receiving radio frequency (RF) readings from an array of RF detectors within the wearable display device, wherein the RF detectors detect a relative location and distance between the wearable display device and an RF transmitter that is positioned on a head of the user; and determining a location, relative to the wearable display device, of a face of the user who is wearing the wearable display device based on the RF readings that are received by the array of RF detectors from the RF transmitter on the head of the user; and a video display controller that adjusts a presentation of an image presented on the display based on the angle of the eyes of the user relative to the display, wherein the video display controller displays a video content on a dynamically adjusted display region of the single continuous display based on the physical three-dimensional orientation of the wearable display device, wherein the dynamically adjusted display region is a single display region that is dynamically moved on the single continuous display, and wherein the video display controller displays the video content on the dynamically adjusted display region of the single continuous display that is facing the face of the user.

11. The wearable display device of claim 10, further comprising:

multiple cameras that capture different images depending on their direction of orientation; and a video image selector logic, wherein the video image selector logic:

detects images that are captured from the multiple cameras;

determines a viewing direction from the eyes of the user to the wearable display device;

identifies a camera that captures offset images from a direction other than the viewing direction from the eyes of the user to the wearable display device; and displays the offset images on the dynamically adjusted display region of the continuous display that faces the face of the user.

12. The wearable display device of claim 10, further comprising:
an array of infrared detectors within the wearable display device; and
a video display controller, wherein the video display controller:
identifies which of the infrared detectors is detecting a highest level of infrared radiation as compared with other infrared detectors from the array of infrared detectors;
determines a location of the face of the user who is wearing the wearable display device as being in a direction that the infrared detector that is detecting the highest level of infrared radiation is facing; and
displays the video content on the dynamically adjusted display region of the continuous display that faces the face of the user.

13. The wearable display device of claim 10, wherein the wearable display device is a flexible output device that further comprises:
flex sensors that detect a level of flexing being incurred by the flexible output device in real time; and
a video display controller, wherein the video display controller:
determines, based on the flex readings, a location and orientation of the flexible output device with relation to the face of the user who is wearing the flexible output device; and
displays the video content on the dynamically adjusted display region of the continuous display that faces the face of the user.

14. The wearable display device of claim 10, wherein the wearable display device is a flexible output device that is worn on an arm of the user, and wherein the flexible output device further comprises:
electromyogram sensors that detect muscular activity within the arm of the user in real time; and
a video display controller, wherein the video display controller:
determines, based on the electromyographic readings, a location and orientation of the wearable display device with relation to a face of the user who is wearing the wearable display device; and
displays the video content on the dynamically adjusted display region of the continuous display that faces the face of the user.

15. A computer program product for displaying video content on a wearable display device, the computer program product comprising a computer readable storage medium having program code embodied therewith, the program code readable and executable by a processor to perform a method comprising:
receiving positioning data from position sensors in a wearable display device, wherein the wearable display device is worn by a user, wherein the position sensors provide positioning data that describe a physical three-dimensional orientation of the wearable display device in real time, and wherein the wearable display device comprises an exterior display surface that comprises multiple video display regions;
displaying a video content on a dynamically adjusted display region of a continuous display based on the physical three-dimensional orientation of the wearable display device;
determining the positioning data that describe the physical three-dimensional orientation of the wearable display device by:
receiving radio frequency (RF) readings from an array of RF detectors within the wearable display device, wherein the RF detectors detect a relative location and distance of an RF transmitter that is positioned on a head of the user; and
determining a location of a face of the user who is wearing the wearable display device based on the RF readings that are received by the array of RF detectors from the RF transmitter on the head of the user; and
displaying the video content on the dynamically adjusted display region of the continuous display that faces the face of the user.

16. The computer program product of claim 15, wherein the method performed by the processor executing the program code further comprises:
receiving, by one or more of the position sensors in the wearable display device, data that describe a location of the face of the user relative to the wearable display device; and
displaying the video content on a video display region, from the dynamically adjusted display region of a continuous display that faces the face of the user.

17. The computer program product of claim 15, wherein the wearable display device comprises multiple cameras, and wherein the method further comprises:
detecting images that are captured from the multiple cameras;
determining a viewing direction from eyes of the user to the wearable display device;
identifying a camera that captures offset images from a direction other than the viewing direction from eyes of the user to the wearable display device; and
displaying the offset images on the dynamically adjusted display region of the continuous display that faces the face of the user.

18. The computer program product of claim 15, wherein the method further comprises:
determining the positioning data that describe the physical three-dimensional orientation of the wearable display device by:
receiving infrared readings from an array of infrared detectors within the wearable display device;
identifying which of the infrared detectors is detecting a highest level of infrared radiation as compared with other infrared detectors from the array of infrared detectors;
determining a location of the face of the user who is wearing the wearable display device as being in a direction that the infrared detector that is detecting the highest level of infrared radiation is facing; and
displaying the video content on the dynamically adjusted display region of the continuous display that faces the face of the user.

* * * * *